Patented Nov. 26, 1929

1,737,192

UNITED STATES PATENT OFFICE

MYRON HEYN, OF BRESLAU, GERMANY, ASSIGNOR, BY MESNE ASSIGNMENTS, TO THE FIRM SCHERING-KAHLBAUM A. G., OF BERLIN, GERMANY

DIGUANIDINE

No Drawing. Application filed July 16, 1926, Serial No. 123,009, and in Germany August 4, 1925.

My invention has reference to new derivatives of guanidine which have been shown to be of great value for the treatment of certain diseases. It more particularly refers to polymethylene diguanidines which were hitherto unknown.

A number of methods for producing derivatives of guanidine were known, amongst them the reaction of cyanamide with amino salts discovered by Erlenmeyer (Berichte 14, 1868/1881). In this reaction there are formed, besides the monoguanyl derivatives also diguanidines.

In my copending application for Letters Patent of the United States, Serial No. 125,322, I have described a method of producing pure monoguanylized diamines.

I have now discovered that diguanidine derivatives can be obtained in a more simple manner and with better yield by causing 2 mols of S-alkyl isothiourea to act on a diamine. The complete reaction takes place at ordinary temperature, and if a S-alkyl-isothiourea is used under the form of a salt, the crystalline salt of the respective diguanidine is at once obtained.

The new method is particularly valuable for the production of higher alkylene diamines, the low solubility of which creates difficulties when preparing these products according to the methods hitherto employed.

Example 1

A concentrated solution of 5 parts by weight of hexamethylene diamine is gradually added to a concentrated solution of 12 parts S-methyl-isothiourea-sulfate in water. The mixture is heated on the water bath until no more methyl mercaptane escapes, whereupon the mixture is acidified with dilute sulfuric acid and well cooled. 50-80 per cent hexamethylene diguanidine sulfate are obtained.

The reaction taking place may be represented as follows:

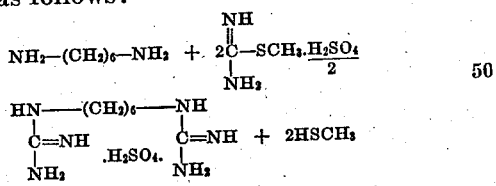

The crystalline product is decomposed by concentrated caustic alkali under development of ammonia. It cannot be distilled. The sulfate melts above 280° C., the hydrochloride at 181-182° C. The picrate dissolves in water only with difficulty.

Example 2

A concentrated watery solution containing 5 parts by weight of decamethylene diamine is gradually added to a concentrated watery solution of 8 parts S-methyl isothiourea sulfate and the mixture is treated further as described with reference to Example 1. There are obtained 50-80 per cent decamethylene-diguanidine sulfate according to the following formula

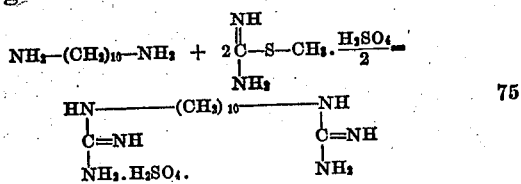

The product forms a crystalline mass. The sulfate melts above 280°, the hydrochloride at 198-200° C. The picrate dissolves in water only with difficulty.

In the claims appended to the specification the terms "polymethylene diguanidines" and "decamethylene diamine" are intended to include also the salts of these compounds.

Various changes may be made in the details disclosed in this specification without departing from the invention or sacrificing the advantages thereof.

I claim:—

1. As new products, polymethylene diguanidines having the formula:

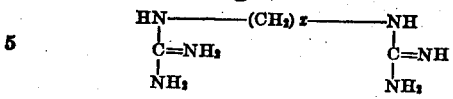

wherein $x$ is a whole number above 5, the products being decomposed by concentrated caustic alkali under development of ammonia, being incapable of being distilled and forming crystallized salts, the pictrates being soluble only with great difficulty.

2. As a new product decamethylene diguanidine having the formula:

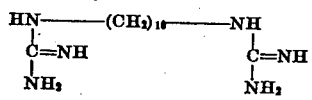

the hydrochloride melting at 198–200° C., the sulfate melting above 280° C. and forming a picrate dissolving in water only with great difficulty, treatment with concentrated caustic alkali causing the splitting off of ammonia.

In testimony whereof I have signed my name to this specification.

MYRON HEYN.